G. A. JOHNSON.
FRICTION GEAR.
APPLICATION FILED FEB. 5, 1917.
1,278,353.
Patented Sept. 10, 1918.
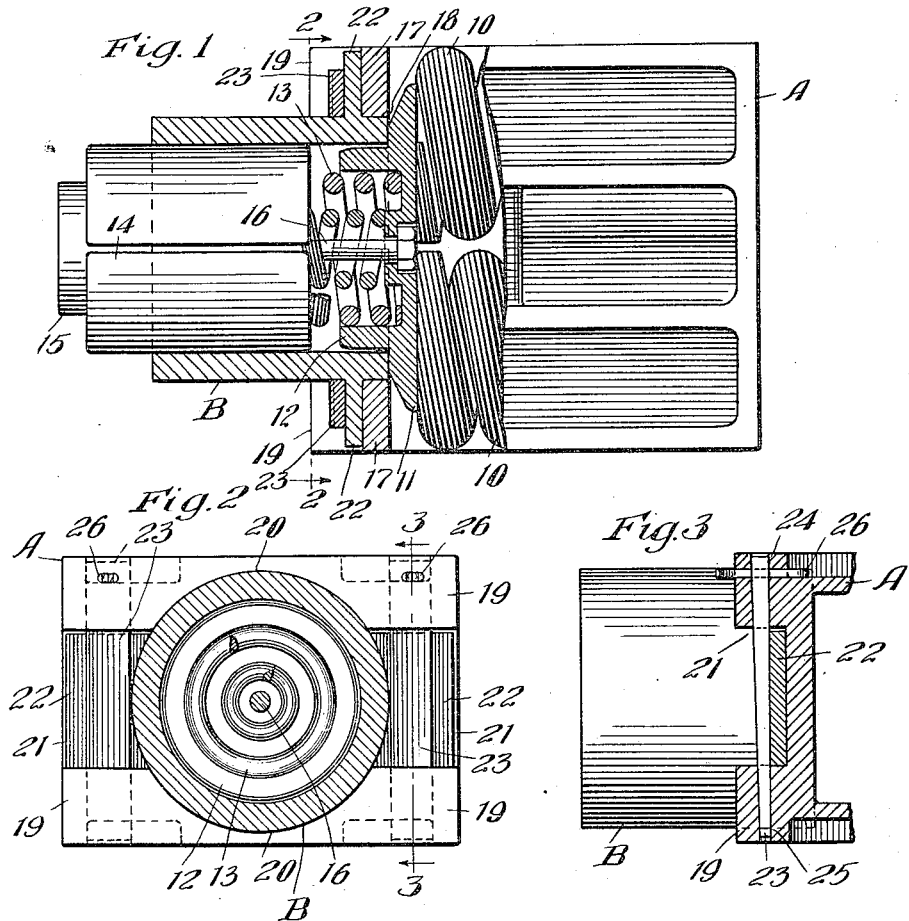
WITNESSES:
Wm. Geiger
INVENTOR.
George A. Johnson
BY George J. Haight
ATTORNEY

UNITED STATES PATENT OFFICE.

GEORGE A. JOHNSON, OF CHICAGO, ILLINOIS, ASSIGNOR TO WILLIAM H. MINER, OF CHAZY, NEW YORK.

FRICTION-GEAR.

1,278,353.

Specification of Letters Patent.

Patented Sept. 10, 1918.

Application filed February 5, 1917. Serial No. 146,615.

*To all whom it may concern:*

Be it known that I, GEORGE A. JOHNSON, a citizen of the United States, residing at Chicago, in the county of Cook and State of Illinois, have invented a certain new and useful Improvement in Friction-Gears, of which the following is a full, clear, concise, and exact description, reference being had to the accompanying drawings, forming a part of this specification.

This invention relates to improvements in friction gears.

The object of the invention is to provide a combined friction shell and spring cage for a friction gear wherein the shell is detachably connected with the spring cage to thereby readily permit renewal or replacement of the friction shell.

In the drawing forming part of this specification, Figure 1 is a part longitudinal section, part top plan of a friction gear showing my improvements in connection therewith. Fig. 2 is a transverse vertical section taken substantially on the line 2—2 of Fig. 1. And Fig. 3 is a longitudinal broken sectional view taken substantially on the line 3—3 of Fig. 2.

In said drawing, A denotes a spring cage and B a friction cylinder of a friction gear. The friction gear, in its broad aspects, is of a well known type, and, as shown, comprises twin arranged main springs 10—10 mounted within the hollow rectangular spring cage A, a spring follower 11 also mounted within the spring cage and having an annular collar 12 which extends within the friction shell, preliminary spring 13, friction shoes 14, and wedge 15. The wedge, shoes, preliminary spring and follower 11 are held in assembled relation by means of a bolt 16.

The spring cage is provided on the front thereof with a transversely extending wall 17 which is centrally recessed, as indicated at 18, to accommodate the inner end of the cylindrical shell B. Forwardly of the wall 17, the member A is provided with upper and lower, transversely extending, relatively heavy shoulders 19—19, the latter being cut away, as indicated at 20—20, to accommodate the friction shell. As clearly appears from Figs. 2 and 3, the shoulders 19—19 form therebetween a transversely extending rectangular recess 21, and in these recesses are adapted to be received diametrically disposed, laterally extending flanges 22—22 formed on the cylinder B. Said flanges 22 are seated within recesses 21 by moving the cylinder B longitudinally with respect to the spring cage A, that is, by movement parallel to the axis of the gear. When the parts have been thus positioned, they are retained by means of a pair of tapered keys 23—23, which pass through suitable perforations 24 and 25 in the upper and lower shoulders 19—19. Said keys 23 bear against the outer faces of the flanges 22 and thus force the latter tightly against the front wall of the spring cage. The keys after being driven home, can be prevented from accidental displacement by any suitable means, such as the cotters 26.

With the arrangement above described, it is apparent that I obtain a tight and firm engagement between the friction cylinder and the spring cage while at the same time the cylinder may be removed or replaced whenever desired, thus increasing the life of the gear by permitting the renewal of that portion which wears out most rapidly.

I claim:

1. In a friction gear, the combination with a friction shell, of a spring cage, one of said members being recessed and the other provided with flanges to engage in the recessed portions, and keys carried by the recessed member and overlying the flanges to thereby retain the parts in assembled relation.

2. In a friction gear, the combination with a spring cage having a recess extending transversely across the front wall thereof, of a friction shell having diametrically disposed flanges fitting within said recess, and detachable keys carried by the spring cage overlying said flanges to thereby retain the parts in assembled position.

In witness that I claim the foregoing I have hereunto subscribed my name this 31st day of Jan. 1917.

GEORGE A. JOHNSON.

Witness:
JOSEPH HARRIS.

Copies of this patent may be obtained for five cents each, by addressing the "Commissioner of Patents, Washington, D. C."